INVENTORS.
Thomas F. Carmichael
Richard J. Maier
Edward H. Schilling
BY
Barnes, Dickey & Pierce
ATTORNEYS.

United States Patent Office 3,270,268
Patented August 30, 1966

3,270,268
ALTERNATOR WITH SILICON CONTROLLED RECTIFIER REGULATOR FOR BATTERY CHARGING
Thomas F. Carmichael, Drayton Plains, Richard J. Maier, Pontiac, and Edward A. Schilling, Drayton Plains, Mich., assignors to Synchro Corporation, Oxford, Mich., a corporation of Michigan
Filed June 4, 1962, Ser. No. 199,811
14 Claims. (Cl. 320—61)

This invention relates generally to regulating systems, and more particularly to alternator systems applicable for use in charging batteries subjected to variable loads, such as in marine use.

It is an object of the invention to provide a novel and improved generator regulating system which achieves a high degree of regulation, is of economical construction, and is reliable in use.

Other objects, features, and advantages of the present invention will become apparent from the subsequent description, taken in conjunction with the accompanying drawings.

In the drawings:

FIGURE 4 is a curve similar to FIGURE 3 showing the voltage when partial regulation is occurring;

FIGURE 5 is a curve similar to FIGURES 3 and 4 showing full regulation;

FIGURE 6 is a circuit diagram showing a modified form of the invention in which a second slave gated regulating circuit is provided for obtaining equal regulation of both half cycles;

FIGURE 7 is a circuit diagram of still another embodiment of the invention in which an additional reactor is placed in the regulating circuit for the purpose of improving regulation at higher generator speeds; and FIGURE 8 is a circuit diagram of another embodiment of the invention in which the regulating winding is connected to the positive battery terminal.

Figure 1:
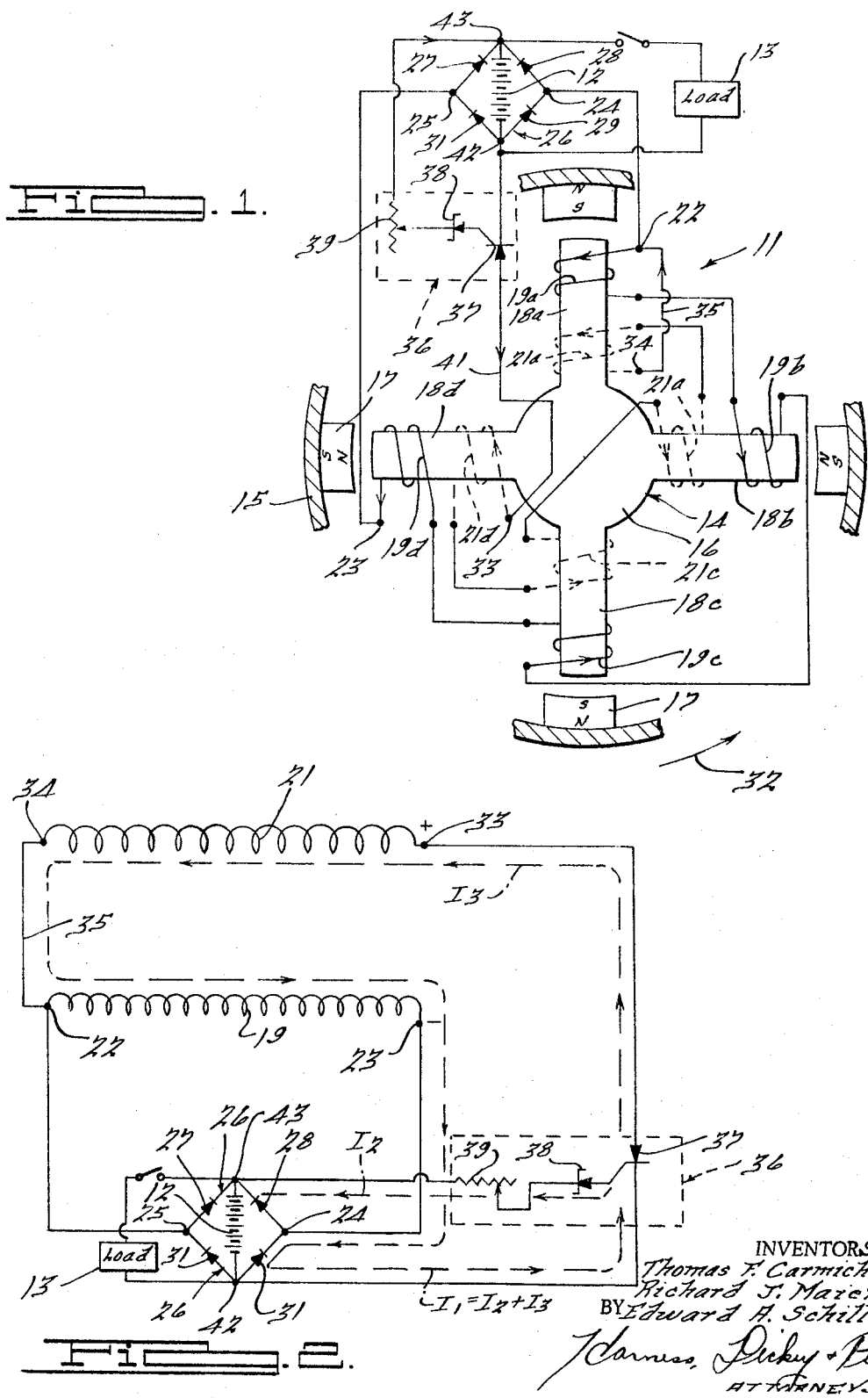
FIGURE 1 is a circuit diagram showing one form of the invention as applied to a four-pole generator.

Briefly, each of the illustrated embodiments of the invention comprises an alternator having two coils on each pole, one coil being referred to as the load winding and the other the regulating winding. The coils on each pole are preferably wound with close magnetic coupling. The load windings are all connected in series and are further connected across a full wave rectifier bridge for battery charging. The regulating windings are likewise connected in series, and are further connected in series with the load windings, either directly or through portions of the rectifier bridge. A voltage-responsive one-way switching device, such as a silicon controlled rectifier, is placed in series with the load and regulating windings so as to form a closed circuit including these windings. In one form of the invention, the regulating windings and controlled rectifier are also connected in series across the battery terminals. A voltage divider, in such form as a zener diode and rheostat in series, is connected to the gate of the controlled rectifier switching device and across the terminals of the battery, functioning as a voltage sensing circuit.

Normally, the load windings will charge the battery through the rectifier bridge, the controlled rectifier maintaining an effectively open circuit for the regulator windings. When the battery terminal voltage exceeds the threshold of the sensing circuit, a negative to positive voltage drop will be created between the cathode and gate of the controlled rectifier during each alternate half cycle. When sufficient gating power is being supplied, the controlled rectifier will fire upon its anode becoming positive with respect to the cathode. The controlled rectifier will thus conduct on each alternate half cycle and in one form of the invention return to a blocking state on intervening half cycles. In the embodiment having the regulating windings and controlled rectifier connected across the battery terminals, conduction will occur during both half cycles.

During at least each alternate half cycle, the controlled rectifier will thus effectively short circuit the load and regulating windings, reducing the battery charging current substantially to zero. When the polarity reverses, the field created in the windings by the current formerly passed through it will collapse, producing a magnetic flux in opposition to that which is tending to create the reverse polarity. This opposing force will in effect saturate the alternator poles and in the embodiment having rectifier blocking on reverse half cycles will reduce the charging current during a major portion of the reverse half cycle.

Upon a reduction in battery voltage due to the above-described regulating effect, the sensing circuit will no longer supply sufficient gating power to fire the controlled rectifier, and conduction will cease on the first inverse half cycle that causes the anode to swing negative with respect to the cathode. When the regulating current stops, the battery voltage will again rise (in the absence of sufficient load) and the cycle will be repeated at a frequency dependent upon the parameters of the circuit and the effective load.

Referring more particularly to the embodiment of FIGURES 1 to 5, the combined generator and regulator is generally indicated at 11 and is adapted to be connected to a battery 12 such as is used, for example, with a marine engine and which has a variable load, indicated schematically at 13.

The generator itself is generally indicated at 14 and comprises a rotor 15 and a stator 16. Rotor 15 has a rotatable ring of magnetic material carrying a plurality of circumferentially spaced magnets 17, four being shown in the illustrated embodiment. It is desirable that magnets 17 be fabricated of material having a high coercive force with a relatively shallow thickness, and certain ceramic magnets have been found suitable for this purpose. The high coercive force is necessary to prevent demagnetization of the magnets by the forces created in the regulator circuit, as hereinafter described. The magnets have radially oriented poles, the magnets being of alternate polarity.

Stator 16 has four poles 18a, 18b, 18c and 18d and is preferably of laminated construction. Each pole has two separate windings, a voltage generating or load winding 19 and a regulating winding 21, the windings being marked to correspond with the poles. Although FIGURE 1 shows the windings on each pole as separated for purposes of clarity, it is preferred to wind each pair of windings 19 and 21 with a close or tight magnetic coupling, for reasons described in detail below.

Windings 19 are connected in series aiding relation between terminals 22 and 23, and these terminals are connected to terminals 24 and 25, respectively, of a full wave rectifier bridge generally indicated at 26. Bridge 26 comprises four diodes 27, 28, 29 and 31 connected across battery 12 so as to convert the A.C. output of generator 14 to D.C. for battery charging purposes. The arrows in the circuit of load windings 19 indicate the direction of current flow when the magnets are in the position shown with rotor rotation indicated by arrow 32 in FIGURE 1, current being considered as flowing from negative to positive for purposes of this explanation.

Regulating windings 21 are likewise connected in series aiding relation between terminals 33 and 34, the load and regulating windings being connected together in series aiding relation by a jumper 35 connecting terminals 22 and 34.

The voltage regulator proper is generally indicated at 36 and comprises a voltage-responsive one-way switching device 37, a zener diode 38 and a variable resistor 39. Device 37, which may be a silicon controlled rectifier, serves as a switching device for regulating current, as described below, and the anode of the rectifier is connected to terminal 33 by a conduit 41. The cathode of rectifier 37 is connected to a terminal 42 which in turn is connected to the negative terminal of battery 12. The gate of rectifier 37 is connected through zener diode 38 and variable resistor 39 to a terminal 43 which in turn is connected to the positive battery terminal.

Figure 2:
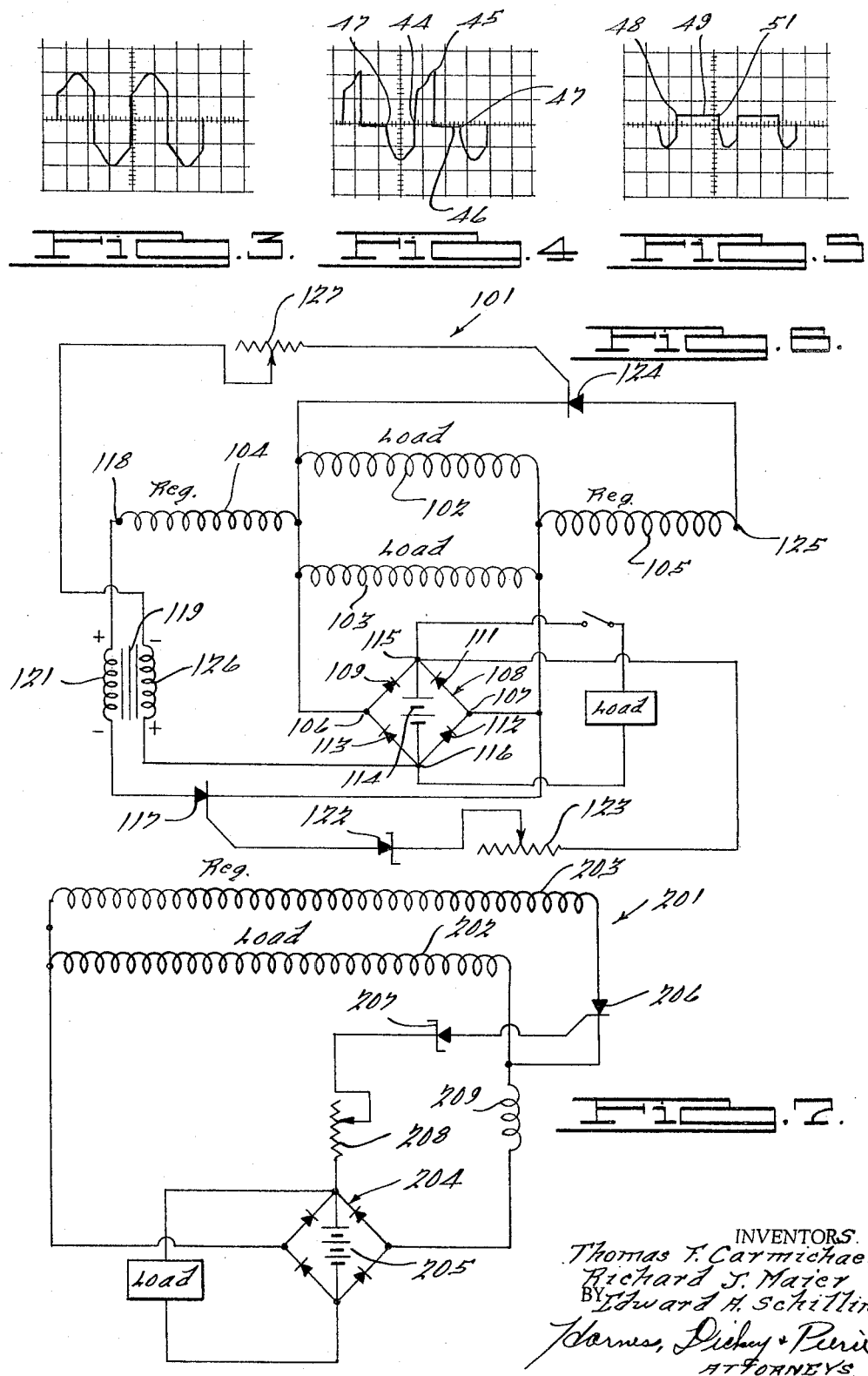
FIGURE 2 is a schematic circuit diagram equivalent to that of FIGURE 1 but laid out to demonstrate the paths of current flow.
Figure 3:
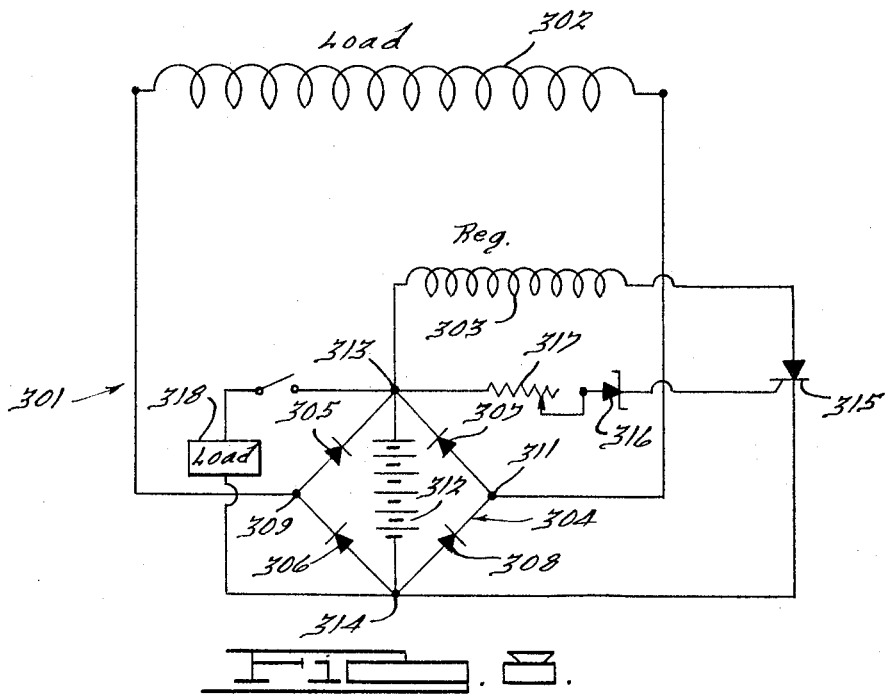
FIGURE 3 is a curve showing the voltage across the silicon controlled rectifier when no regulation is taking place.

In describing the operation of the circuit, reference will be made to FIGURES 2 to 5. In FIGURE 2, the circuit is arranged somewhat differently than that in FIGURE 1 so as to facilitate an understanding of current flow. When battery voltage is below the regulating level, rectifier 37 is not conducting, and regulating windings 21 are therefore out of the circuit. Assuming that the voltage generated by windings 19 is greater than the voltage of the battery, the battery will be charged by the A.C. potential applied to terminals 24 and 25 of rectifier bridge 26. At this time, the voltage across rectifier 37 will be similar to that shown in FIGURE 3. FIGURES 3, 4 and 5 are reproductions of actual oscilloscope tracings of tests run on a generator and regulator constructed according to the above-described principles of the invention. The generator was of twelve-pole construction rather than the four-pole construction shown in the illustrated embodiment. The generator had twenty turns of No. 13 A.W.G. wire in each of the load windings and twenty turns of No. 18 A.W.G. wire in each of the regulating windings.

As the battery charge increases due to the generator action, its terminal voltage will rise until the threshold of zener diode 38 is reached, causing the latter to avalanche and producing the current indicated at $I_2$ in FIGURE 2. This current will be produced by the battery terminal voltage and will pass from the cathode to the gate of rectifier 37 and through adjustable resistor 39. This will create a negative to positive voltage drop between the cathode and the gate of rectifier 37.

The parameters of zener diode 38 and variable resistor 39 are so chosen as to gate rectifier 37 when the terminal voltage of battery 12 reaches a predetermined value. For example, zener diode 38 may be so chosen as to initiate current $I_2$ when the battery terminal voltage reaches 10 volts. As the terminal voltage increases above 10 volts, the voltage drop across zener diode 38 will remain substantially constant, but the current will increase, increasing the voltage drop in resistor 39 and between the cathode and gate of rectifier 37. Resistor 39 may be set to a position such that upon attainment of a battery terminal voltage of 15 volts, the voltage drop between the cathode and gate of rectifier 37 will be sufficient to gate the rectifier when terminal 23 next becomes fully negative and terminal 33 fully positive. In other words, this current, indicated at $I_3$ in FIGURE 2, will occur during the first generated half cycle that produces the polarity indicated in FIGURE 2 for these two terminals, and on each successive half cycle of the same polarity until the battery terminal voltage falls below the regulating level.

Current $I_3$ passed by rectifier 37 is half wave D.C. Its path will be from terminal 23 through diode 31, rectifier 37, terminal 33, windings 21, terminal 34, conduit 35, terminal 22, and windings 19. This effectively short circuits both load and regulating windings on the half cycle indicated, reducing battery charging current to zero.

When the polarity reverses due to the advancing rotor magnets, the D.C. field created by $I_3$ collapses, producing a magnetic flux in opposition to that which is tending to create the reverse polarity. This opposing force in effect saturates the alternator poles 18 and holds the battery charging current essentially at zero during a major portion of the reverse half cycle.

This is indicated in FIGURE 4, which shows the voltage across rectifier 37 when partial regulation is taking place. Beginning at a point 44 when terminal 23 becomes negative and terminal 33 positive, the voltage across rectifier 37 will increase until this voltage, as aided by the voltage drop between the cathode and gate due to current $I_2$, is sufficient to fire or gate rectifier 37. At this point, indicated at 45, the voltage across rectifier 37 will drop to zero, indicating that the regulating current $I_3$ is flowing.

At point 46, rotor 15 will have moved to a position such that the polarity at terminal 23 becomes positive and the polarity at terminal 33 becomes negative. However, due to the above-described action of the collapsing field, no battery charging voltage will be built up, as indicated by the fact that the voltage across rectifier 37 remains zero. It is only at point 47, after a substantial portion of this half cycle has passed, that the blocking action of rectifier 37 in the reverse direction will begin to take place, the negative voltage rising as indicated in FIGURE 4. During this portion of the cycle, the generating windings 19 will be effective to charge the battery, but the average charging current through the entire cycle will be greatly diminished from that occurring before rectifier 37 was gated.

Should the battery terminal voltage continue to rise under these partial regulating conditions, $I_2$ will increase, thus increasing the voltage drop between the cathode and the gate of rectifier 37. This will have the effect of gating rectifier 37 at an earlier point in each alternate half cycle in which the cathode swings negative with respect to the anode. This is indicated in FIGURE 5, which shows the voltage across rectifier 37 when full regulation is taking place. Considering point 48 as that at which the cathode of rectifier 37 begins to assume negative polarity with respect to the anode, the rectifier will fire at this point, and current $I_3$ will flow throughout this half cycle, which ends at point 49. No charging current will be supplied to battery 12 during this period. As in the previous case, the collapsing field when the polarity is reversed on the next half cycle will prevent battery charging current from being supplied during a substantial portion of this inverse half cycle, that is, until point 51 in FIGURE 5. The average current being supplied to the battery through both half cycles will thus be greatly reduced from that supplied under the conditions represented by FIGURE 4.

FIGURE 6 illustrates another embodiment of the invention which differs from that of FIGURES 1 and 2 mainly in that two sets of regulating windings are provided in series with the load windings, provision being made for shunting the load windings through alternate regulating windings in successive half cycles, thereby achieving a more complete regulating effect. As shown, the generator and regulator is generally indicated at 101 and includes two sets of voltage generating or load windings 102 and 103 in parallel relation and wound upon the stator poles (not shown). First and second sets of regulating windings 104 and 105, respectively, are connected in series aiding relation and on the same stator poles as load windings 102 and 103. Load windings 102 and 103 are connected across terminals 106 and 107 of a full wave rectifier bridge generally indicated at 108 and comprising diodes 109, 111, 112 and 113, a battery 114 being connected to the output terminals 115 and 116 of the bridge.

A silicon controlled rectifier 117 has its cathode connected to terminal 107 and its anode connected to a terminal 118 at one end of regulating winding 104. A transformer 119 has its primary coil 121 connected in series with the anode of rectifier 117 and regulating winding 104. A voltage sensing circuit including a zener diode 122 and a variable resistor 123 is connected between the gate of rectifier 117 and terminal 115.

An additional silicon controlled rectifier 124 is connected between the outer terminal 125 of regulating winding 105 and terminal 106. The gate of rectifier 124 is controlled by a slave gating circuit comprising the secondary winding 126 of transformer 119 which is in series with a variable resistor 127.

In operation of the embodiment shown in FIGURE 6, assuming an initial condition in which battery 114 has a lower terminal voltage than that needed to fire rectifier 117, rotation of the generator rotor (not shown) will result in charging of the battery by means of load windings 102 and 103, both regulating windings 104 and 105 being out of the circuit in view of the blocked state of rectifiers 117 and 124. Upon the attainment of a sufficient terminal voltage for battery 114, current will begin to flow through the voltage sensing circuit including zener diode 122 and variable resistor 123. This will create a voltage drop between the cathode and gate of rectifier 117. When this voltage drop is sufficient to gate rectifier 117, the rectifier will fire when its cathode next swings negative with respect to its anode.

This will in effect shunt load windings 102 and 103 as well as regulator winding 104 through rectifier 117, so that no charging current will be delivered to the battery during this half cycle.

In the half cycle during which rectifier 117 fires, rectifier 124 will be in its blocking state since its cathode is positive with respect to its anode. As the generator rotor moves to a position in which the polarities are reversed, the collapse of the field of transformer primary winding 121 will create a voltage in secondary winding 126 such that current will flow from the cathode to the gate of rectifier 124. Since the cathode of rectifier 124 is then becoming negative with respect to its anode, rectifier 124 will fire, in effect short circuiting load windings 102 and 103 and regulating winding 105. Thus no charging current will be delivered to battery 114 during the inverse half cycle. This regulating action will continue until the battery terminal voltage falls below that required to gate rectifier 117. When this occurs, the regulating current will be halted upon the first inverse half cycle during which rectifier 117 fails to gate.

It should be observed that in addition to achieving regulation on both half cycles, the embodiment of FIGURE 6 is also capable of providing either partial or full regulation in accordance with the amount of bias created at the gate of rectifier 117 by the sensing circuit which includes zener diode 122 and variable resistor 123.

FIGURE 7 shows still another embodiment of the invention which is basically similar to that of FIGURES 1 and 2, but in which a reactor is provided for obtaining more efficient regulation at higher frequencies or rotor speeds. The generator and regulator is generally indicated at 201 and includes load windings 202 and regulating windings 203 in series aiding relation and wound on the stator (not shown) in fashion similar to that of FIGURES 1 and 2. Windings 202 are connected across a full wave rectifier bridge 204 to the output of which a battery 205 is connected. The anode of a silicon controlled rectifier 206 is connected to one end of regulating windings 203, and a voltage sensing circuit comprising a zener diode 207 and a variable resistor 208 is connected between the gate of rectifier 206 and the positive battery terminal.

A reactor comprising an inductive coil or coils 209 is connected between the cathode of rectifier 206 and one input terminal of bridge 204, the rectifier cathode also being connected to one end of load windings 202. Reactor 209 may be mounted directly on the stator, in the form of a few turns wound on top of each load coil, the turns being wound in series opposed relation with load windings 202.

In operation, the generator and regulator of FIGURE 7 will function similarly to the embodiment of FIGURES 1 and 2. However, at higher speeds and frequencies, where inefficient regulation would otherwise be obtained because of the output of the load windings on the inverse half cycles, reactor 209 will serve to choke this charging current. Better regulation will thus be obtained at higher frequencies without materially affecting the generator efficiency at lower speeds and frequencies. If reactor 209 is mounted on the stator poles in the manner described above, the fact that the reactor windings are in series opposition to the load windings will prevent the reactor from aiding the load windings in providing charging current, and thus will not detract from the efficiency of regulation.

As indicated above, it has been found that the close or tight coupling between the load and regulating windings on each pole is advantageous in carrying out the objects of the invention. This close coupling may be achieved by various methods, such as winding the load turns on top of the regulating turns or modifying the magnetic path of the alternator to create better magnetic coupling between the load and regulating turns on each pole. Another alternative would be to use an inductive-capacitative type of winding such as copper and aluminum strips separated by dielectric strips, with one of the conductive strips being used for the load winding and the other for the regulating winding. A similar construction is shown and described in copending application Serial No. 42,936, filed July 14, 1960, and entitled Generator and Regulator, this application having the same assignee as the present application.

In comparative tests conducted between two units, one of which had load and regulating windings separately wound on each pole the other load and regulating windings wound together on each pole with close magnetic coupling, the latter unit was found to produce substantially less battery charging current under full regulating conditions, especially at high rotational speeds.

FIGURE 8 illustrates another embodiment of the invention which differs from those previously described in that the regulating windings and voltage-sensitive switching device are connected in series across the battery terminals. The unit is generally indicated at 301 and includes load windings 302 and regulating windings 303, each of these windings comprising coils in series wound on the stator poles (not shown), with one load coil and one regulating coil on each pole, preferably wound with close magnetic coupling. A rectifier bridge generally indicated at 304 is provided, the bridge having rectifiers 305, 306, 307 and 308. Load windings 302 are connected across terminals 309 and 311 of bridge 304, and battery 312 is connected between bridge terminals 313 and 314, with the positive battery terminal being connected to bridge terminal 313. One end of regulating windings 303 is connected to terminal 313 of bridge 304 and the other end to one side of a voltage-responsive one-way switching device, such as the anode of a silicon controlled rectifier 315. The cathode of rectifier 315 is connected to bridge terminal 314. A gating circuit comprising a zener diode 316 and a variable resistor 317 are connected in series with the gate of rectifier 315 to terminal 313 of the bridge. A load 318 is shown as being connected across terminals 313 and 314, that is, across the battery.

In operation of the embodiment of FIGURE 8, when the battery voltage is below the regulating level, rectifier 315 will not be conducting, and regulating windings 303 will therefore be out of the circuit. The A.C. potential applied to terminals 309 and 311 will serve to charge battery 312 through bridge 304, and if the battery terminal voltage rises sufficiently, it will cause zener diode 316 to avalanche. The current passing from the cathode to the gate of rectifier 315 through adjustable resistor 317 will create a negative to positive voltage drop between the cathode and gate. When the terminal voltage of battery 312 reaches a predetermined value, as set by resistor 317, the current in the voltage sensing circuit will rise sufficiently to gate rectifier 315 on the first generator half cycle in which the rectifier anode becomes positive with respect to the cathode, as described with respect to the previous embodiments.

This will cause the load and regulating windings to be connected in series with the load current shunted around battery 312. The current flow path when terminal 309 is negative and terminal 311 is positive may be traced as follows: From terminal 309 through rectifier 306, terminal 314, controlled rectifier 315, regulating windings 303, terminal 313, rectifier 307, terminal 311, and load windings 302 to terminal 309.

Because the positive terminal of battery 312 is connected to the anode of rectifier 315 through regulating windings 303, a D.C. potential is effectively placed between the anode and cathode of rectifier 315. Normally, this would cause the controlled rectifier to stay in conduction once it had been gated, and it would continue to conduct until the D.C. source potential were removed. In the present circuit, since the A.C. potential of the regulating windings is superimposed on this D.C. potential, the controlled rectifier will shut off when gate power is reduced to a level below that at which the rectifier will gate. Stated another way, the D.C. potential will cause constant current flow through the controlled rectifier when sufficient gate power exists to gate the rectifier. This current will be modulated by the A.C. produced by the regulating windings. When the gate power drops below a predetermined value, due to a drop in battery terminal voltage after a period of regulation, the A.C. potential generated by the regulating windings will override the D.C. potential and cause the controlled rectifier to shut off on the first half cycle that produces a negative voltage on the anode of the rectifier with respect to the cathode.

Since the potentials of the load and regulating windings reverse simultaneously, the fact that controlled rectifier 315 conducts on both half cycles of the regulating winding when sufficient gate potential exists, will mean that the short circuit path for the load winding will also exist when its polarity reverses. This circuit may be traced as follows for half cycles in which terminal 311 is negative and terminal 309 is positive: From terminal 311 through rectifier 308, terminal 314, controlled rectifier 315, regulating windings 303, terminal 313, rectifier 305, terminal 309 and load windings 302 to terminal 311.

Gradations between partial and full regulation as exemplified by FIGURES 4 and 5 with respect to the embodiment of FIGURES 1 and 2, will also be possible with the circuit of FIGURE 8, with the difference that short circuiting of the load winding will take place on both half cycles instead of alternate half cycles.

In constructing a unit such as that shown at 301, the following factors should be noted:

(a) The impedance of the regulating windings 303 must be held to a minimum to insure that all of the current produced by the load windings is shunted through the regulating windings rather than passing through battery 312 when the system is regulating.

(b) A controlled rectifier 315 capable of carrying the short circuit current must be used.

(c) A lighter duty controlled rectifier may be used if a tight or close coupling is provided between the load and regulating windings, utilizing the effective cancellation due to opposed electromagnetic fields between the two windings.

The circuit shown in FIGURE 8 offers several advantages over that shown, for example, in FIGURES 1 and 2, as follows:

(1) Any degree of shutdown at high speeds may be obtained because both half cycles of the load windings are shunted around the battery. The degree of shutdown may, of course, be controlled by selecting the proper ratios between load and regulating winding turns, wire sizes, etc., or varying the degree of magnetic coupling between the two windings on each pole.

(2) The same amount of shutdown can be obtained by the circuit of FIGURE 8 as with the circuit of FIGURES 1 and 2 but with less regulating current, thus permitting the use of a less expensive switching device 315.

(3) The circuit of FIGURE 8 will generally produce smoother regulation than that of FIGURES 1 and 2 because no current will flow through the battery when the controlled rectifier 315 is conductive. Hence, the battery terminal voltage will fall more rapidly, resulting in faster cycling of the controlled rectifier.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a regulated system for supplying power to a battery, a generator including a load winding for connection to said battery and a regulating winding in series with said load winding, a nonconductive voltage-responsive one-way switching device in series with said load and regulating windings, and means responsive to the magnitude of voltage across the battery being supplied across said load winding for causing said switching device to be conductive whereby said load and regulating windings will be short circuited around said battery during at least alternate half cycles, said switching device being shiftable to its nonconductive state upon the attainment of a predetermined polarity in said regulating winding and a decrease in the magnitude of said battery voltage.

2. In combination, a generator having stator and rotor elements, a plurality of poles on one of said elements, series-connected load windings and series-connected regulating windings on said poles, the windings on each pole being wound with a close magnetic coupling, rectifier means for connecting said load windings across a battery, means connecting one end of said regulating windings in series with one end of said load windings, a controlled rectifier connected in series with the other end of said regulating windings and one terminal of said battery, and a voltage-responsive sensing circuit for said controlled rectifier connected across said battery, said sensing circuit being responsive to a rise in the magnitude of battery voltage for gating said controlled rectifier and thus short circuiting said load windings around said battery during at least alternate half cycles.

3. A regulated power supply system comprising a battery, a generator including magnetic means for providing a magnetic field and voltage generating winding means, said magnetic means including at least one ceramic magnet having a high coercive force and radially having a relatively shallow thickness, a controlled rectifier circuit means electrically connected to said winding means and including said controlled rectifier for defining a low impedance path, and means responsive to the magnitude of the voltage across said battery for gating said rectifier, whereby said winding means will be circuited through said low impedance path and around said battery during selected alternate half cycles.

4. In a regulated power supply system a battery, a generator including magnetic means for providing a magnetic field and voltage generating winding means, said magnetic means including at least one ceramic magnet having a high coercive force and radially having a relatively shallow thickness, a controlled rectifier, circuit means including said controlled rectifier connected to said winding means for defining a path from said winding means around said battery, and a gating circuit connected to said rectifier, said gating circuit being responsive to a rise in battery terminal voltage to permit said controlled rectifier to fire during alternate half cycles whereby said winding means will be circuited through said rectifier during said alternate half cycles, the gating circuit being responsive to a drop in battery terminal voltage to shut off said rectifier.

5. In a regulated power supply system, a battery, a generator including magnetic means for providing a magnetic field and voltage generating winding means, said magnetic means including at least one ceramic magnet having a high coercive force and radially having a relatively shallow thickness, rectifier means connecting said battery to said voltage generating winding means, a controlled rectifier, circuit means including said controlled rectifier connected to said winding means for defining a path from said winding means around said battery, and a gating circuit connected across said battery and responsive to the magnitude of battery voltage for gating said controlled rectifier.

6. In a regulated power supply system, a battery, a generator including magnetic means for providing a magnetic field and voltage generating winding means, said magnetic means including at least one ceramic magnetic having a high coercive force and radially having a relatively shallow thickness, rectifier means connecting said voltage generating winding means to said battery, said generator further including regulating winding means, a controlled rectifier, circuit means including said controlled rectifier and said regulating winding means for defining a path from said generating winding means around said battery, and a gating circuit including a zener diode and a resistor connected between said controlled rectifier and one terminal of said battery, said gating circuit being effective when the voltage across said battery is greater than a preselected value for gating said rectifier, whereby said winding means will be circuited through said path during alternate half cycles.

7. In a regulated power supply system, a battery, a generator having stator and rotor elements, voltage generating winding means on one of said elements, rectifier means connecting said voltage generating winding means to said battery, a plurality of ceramic magnets on the other element, each of said magnets having a high coercive force and radially having a relatively shallow thickness, a silicon controlled rectifier, circuit means including said controlled rectifier connected to said winding means for defining a path from said winding means around said battery, and a gating circuit responsive to a rise in the terminal voltage of said battery for gating said silicon controlled rectifier.

8. In a regulated power supply system, a battery, a generator having a stator and a rotor, a plurality of poles on said stator, voltage generating winding means on each of said poles connected in series aiding relation, a plurality of ceramic magnets located on said rotor, each of said magnets having a high coercive force and radially having a relatively shallow thickness, rectifier means connecting said voltage generating winding means to said battery, regulating winding means on each of said poles, said regulating winding means being connected in series aiding relation with said voltage generating winding means, a silicon controlled rectifier, circuit means including said controlled rectifier and said regulating winding means for defining a path from said generating winding means around said battery, and a voltage sensing circuit responsive to a rise in battery terminal voltage for gating said silicon controlled rectifier.

9. In a regulated power supply system, a battery, a generator including magnetic means for providing a magnetic field and voltage generating winding means, said magnetic means including at least one ceramic magnet having a high coercive force and radially having a relatively shallow thickness, rectifying means connecting said voltage generating winding means across said battery, a reactor for suppressing current supplied at relatively high frequencies by said voltage generating winding means to said battery, regulating winding means connected in series aiding relation with said voltage generating winding means, a controlled rectifier, circuit means including said controlled rectifier and said regulating winding means for defining a path from said generating winding means around said battery, and a gating circuit connected to said controlled rectifier and responsive to a rise in battery terminal voltage for gating said controlled rectifier.

10. In combination, a generator having stator and rotor elements, a load winding and a regulating winding on one of said elements, bridge rectifier means for connecting said load winding to a battery for charging purposes, means connecting one end of said regulating winding to one battery terminal, a controlled rectifier connected between the other end of said regulating winding and the other battery terminal, and a voltage-responsive sensing circuit connected to said controlled rectifier and across said battery, said sensing circuit being responsive to the magnitude of battery terminal voltage to gate said controlled rectifier, whereby said load and regulating windings will be connected in series with said load windings shunted around said battery through portions of said bridge rectifier.

11. In a regulated power supply system for a battery, stator and rotor elements, a plurality of poles on one of said elements, series-connected load windings on said poles, series-connected regulating windings on said poles wound in close magnetic coupling with said load windings, a bridge rectifier circuit for connecting said load windings across said battery, a connection between one end of said regulating windings and one battery terminal, a controlled rectifier connected in series between the other end of said regulating windings and the other battery terminal, and a gating circuit connected between the gate of said controlled rectifier and said one battery terminal, said gating circuit being responsive to a rise in battery voltage to cause said controlled rectifier to become conductive, whereby said load winding will be shunted around said battery through portions of said rectifier circuit and said regulating windings during portions of successive half cycles, said controlled rectifier being responsive to a decrease in battery terminal voltage and to the attainment of a predetermined polarity in said regulating windings to become nonconductive.

12. In a regulated system for supplying power to a battery, a generator including stator and rotor elements, voltage generating winding means on one of said elements, rectifier means connecting said voltage generating winding means to said battery, at least one magnet on the other element having radially disposed poles, said magnet being fabricated of ceramic material and having a high coercive force with a relatively shallow thickness between said poles, a normally non-conductive voltage-responsive switching device electrically connected with said winding means, a low impedance path electrically connected with said switching device and said winding means and means responsive to the magnitude of voltage across said battery for causing said switching device to become conductive whereby said winding means will be circuited around said battery through said low impedance path.

13. In a regulated system for supplying power to a battery, a generator having stator and rotor elements, a load winding on one of said elements for connection to said battery, a regulating winding on said one element in series with said load winding, at least one ceramic magnet on said other element having a relatively high coercive force, said magnet radially having a relatively shallow thickness, a non-conductive voltage-responsive one-way switching device in series with said load and regulating windings, and means responsive to the magnitude of voltage across the battery for causing said switching device to be conductive whereby said load and regulating windings will be short circuited around said battery during at least alternate half cycles, said switching device being shiftable to its non-conductive state upon the attainment of a predetermined polarity in said regulating winding and a decrease in the magnitude of said battery voltage.

14. A regulated power supply system comprising a battery, a generator having stator and rotor elements, at least one ceramic magnet having a relatively high coercive force located on one of said elements and radially having a relatively shallow thickness, voltage-generating winding means on the other element, a controlled rectifier connected across said winding means, and means responsive to the magnitude of voltage across said battery for gating said rectifier, whereby said winding means will be short circuited during selected alternate half cycles.

References Cited by the Examiner

UNITED STATES PATENTS

| 2,900,591 | 8/1959 | Jacob | 322—90 |
| 3,009,091 | 11/1961 | Hallidy | 322—79 |
| 3,070,739 | 12/1962 | Hansen et al. | 323—22 |
| 3,141,124 | 7/1964 | Atherton | 320—1 |

FOREIGN PATENTS 759,885   10/1956   Great Britain.

JOHN F. COUCH, *Primary Examiner.*

LLOYD McCOLLUM, *Examiner.*

R. C. SIMS, S. WEINBERG, *Assistant Examiners.*